United States Patent [19]

Assmann et al.

[11] 4,348,339
[45] Sep. 7, 1982

[54] METHOD FOR MANUFACTURING OXIDIC NUCLEAR FUEL BODIES

[75] Inventors: Helmut Assmann, Dormitz; Egbert Brandau, Bebra; Wolfgang Dörr, Erlangen; Viktor Mathieu, Neuberg; Gerhard Dichtjar, Langenselbold, all of Fed. Rep. of Germany

[73] Assignees: Kraftwerk Union Aktiengesellschaft; Reaktor-Brennelement Union GmbH, both of Mülheim, Fed. Rep. of Germany

[21] Appl. No.: 104,973

[22] Filed: Dec. 18, 1979

[30] Foreign Application Priority Data

Dec. 20, 1978 [DE] Fed. Rep. of Germany ....... 2855166

[51] Int. Cl.³ .............................................. G21C 21/00
[52] U.S. Cl. ..................................... 264/0.5; 252/643; 422/159; 423/261
[58] Field of Search ......................... 264/0.5; 422/159; 432/198; 423/261; 252/301.1 R

[56] References Cited

U.S. PATENT DOCUMENTS

| | | | |
|---|---|---|---|
| 3,094,377 | 6/1963 | Langrod | 423/261 |
| 3,258,317 | 6/1966 | Brearton | 423/261 |
| 3,375,306 | 3/1968 | Russell et al. | 264/0.5 |
| 3,641,227 | 2/1972 | Horsley et al. | 264/0.5 |
| 3,761,546 | 9/1973 | Wilhelm et al. | 264/0.5 |
| 3,930,787 | 1/1976 | DeHollander et al. | 264/0.5 |

FOREIGN PATENT DOCUMENTS 1332928 10/1973 United Kingdom ................ 432/198

Primary Examiner—Deborah L. Kyle
Attorney, Agent, or Firm—Herbert L. Lerner; Laurence A. Greenberg

[57] ABSTRACT

Manufacture of oxidic nuclear fuel bodies with oxygen-to-metal ratio of 2.0±0.02 at relatively low sintering temperature in range of 1000°–1400° C. Nuclear fuel powder with an arbitrary oxygen-to-metal ratio is mixed with a grain-growth promoting additive ($U_3O_8$) and pressed into blanks. The blanks are subjected to a two-stage operation in a furnace at 1000°–1400° C. - an oxidative-sintering stage in a carbon dioxide atmosphere and a reducing stage in a hydrogen containing atmosphere.

10 Claims, 2 Drawing Figures

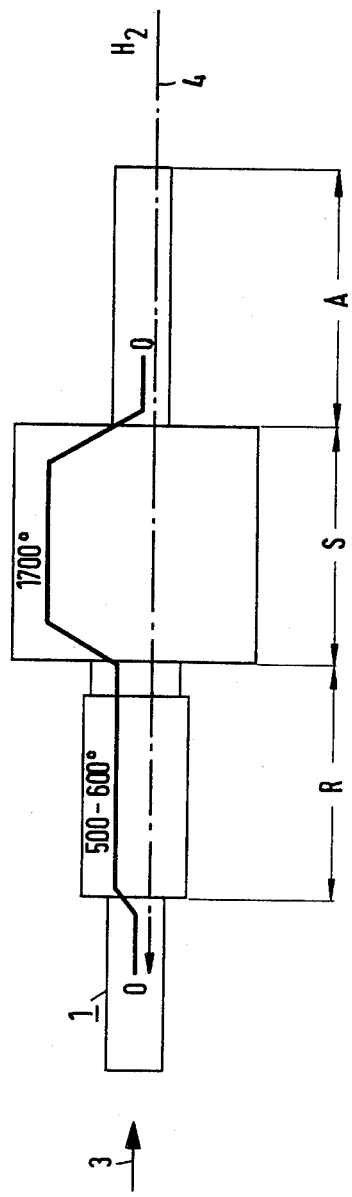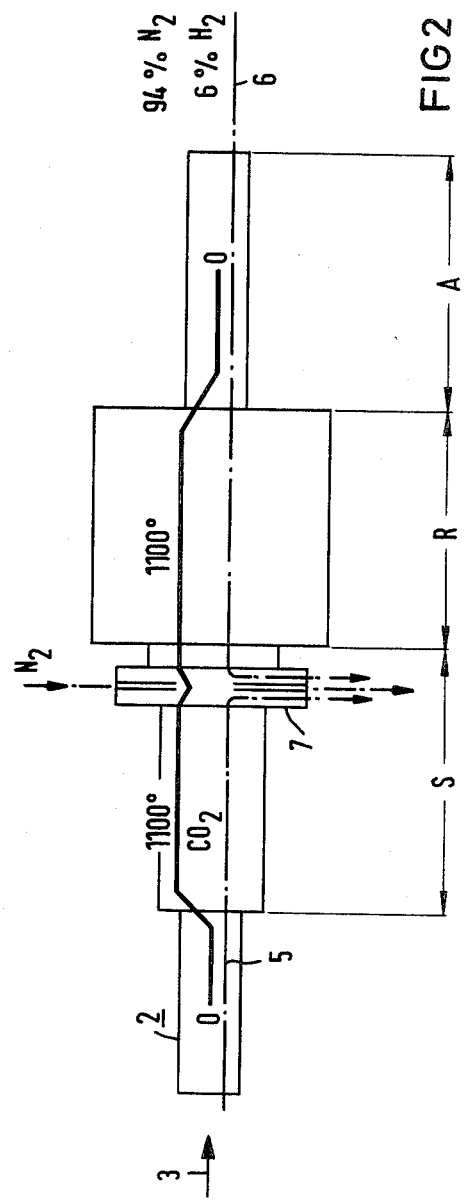

METHOD FOR MANUFACTURING OXIDIC NUCLEAR FUEL BODIES

BACKGROUND OF THE INVENTION

1. Field of the Invention

The present invention relates to a method for manufacturing oxidic nuclear fuel bodies with an oxygen-to-metal ratio of 2.0±0.02 at sintering temperatures between 1000° and 1400° C.

2. Description of the Prior Art

In the manufacture of nuclear fuel bodies, it is the general practice today to sinter them in a reducing atmosphere at 1700° C. Hydrogen or cracked ammonia is used as the reducing atmosphere. Sintered bodies of nuclear fuel materials must attain high operating reliability during the irradiation in the nuclear reactor; they must therefore meet special requirements. These requirements are in substance: The sintered density of the molded bodies is to be higher than 93% of theoretical density; the microstructures should be stable against densification; and the fission gas liberation should be limited; for reasons of corrosion, the fluorine contents should be less than 10 ppm; and an oxygen-to-metal ratio of 2.0±0.02 should be maintained.

Since the present furnace temperatures of 1700° C. represent an extraordinarily high stress for the furnace insulation and the furnace lining as well as for the heating elements, which limits the service life seriously, it would be highly desirable if sintering temperatures were sufficient which are substantially lower. Therefore, various proposals in this respect have been made. According to a proposal of U.S. Pat. No. 3,375,306, the pressed nuclear fuel powder is sintered in gas mixtures of $CO_2$ and CO up to 95% of its theoretical density at a temperature of 1300° to 1600° C. The reduction of the overstoichiometrically sintered molding is accomplished during the cooling in hydrogen or in mixtures of $CO_2$ and CO. A method described in U.S. Pat. No. 3,927,154 works likewise with $CO_2$/CO mixtures and sintering temperatures in the range of 1000° to 1400° C. This method represents in substance sintering operation with continuously changing oxygen-to-metal ratio in the sintered body. The oxygen potential present in the sintering atmosphere is low, so that from the moment of reaching the sintering temperature on, the oxygen-to-metal ratio of the sintered body decreases slowly and finally should reach the specified value $\leq 2.02$. Thus, this method depends heavily on the oxygen-to-metal ratio of the starting powder. Unfortunately, these sintering methods have not found acceptance in practice.

SUMMARY OF THE INVENTION

An object of the present invention is to provide a method and apparatus for effectively sintering nuclear fuels in temperature ranges of 1000°–1400° C., which produce reliably, leads to uniform end products, the grain structure of which can also be adjusted, independently of the oxygen-to-metal ratio of the starting powder of the nuclear fuel to be sintered.

With the foregoing and other objects in view, there is provided in accordance with the invention a method for manufacturing oxidic nuclear fuel bodies with an oxygen-to-metal ratio of 2.0±0.02 at sintering temperatures between 1000° and 1400° C., which comprises adding a grain-growth-promoting sintering additive to a nuclear fuel powder with an arbitrary oxygen-to-metal ratio, mixing the additive and fuel powder and pressing the mixture into blanks, passing the blanks into a sintering zone of a furnace and sintering the blanks therein in an oxidizing atmosphere at a temperature within the range of 1000°–1400° C., and subsequently passing the sintered blanks into a reducing zone and treating the blanks therein in a reducing atmosphere at a temperature within the range of 1000°–1400° C.

In accordance with the invention, there is provided an apparatus for manufacturing oxidic nuclear fuel bodies with an oxygen-to-metal-ratio of 2.0±0.02 at sintering temperatures between 1000° and 1400° C., which comprises a high-temperature furnace with a continuous passageway through which nuclear bodies are moved, said passageway having an oxidation zone followed by a reduction zone with the two zones separated by a gas lock, transport means for moving the nuclear bodies into and through the oxidation zone, then the gas lock, and then through and out of the reduction zone, an inlet near the entrance of the oxidation zone for the introduction of $CO_2$-gas and an outlet at the gas lock for the discharge of $CO_2$-gas with the $CO_2$-gas passing through the oxidation zone in the same direction as the nuclear bodies, conduit means in the gas lock for removing the discharged $CO_2$-gas, a second inlet near the exit of the reduction zone for the introduction of a reducing gas and an outlet at the gas lock for the discharge of reducing gas with the reducing gas passing through the reduction zone in a direction opposite to the direction of the nuclear bodies, an inlet and an outlet to the gas-lock for continuously flushing the gas-lock with an inert gas, and electrical heating means for heating the oxidizing zone and the reduction zone at temperatures between 1000° and 1400° C.

Other features which are considered as characteristic for the invention are set forth in the appended claims.

Although the invention is illustrated and described herein as embodied in a method for manufacturing oxidic nuclear fuel bodies, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which:

FIG. 1 diagrammatically illustrates the construction of a high-temperature sintering furnace in use at the present time.

FIG. 2 diagrammatically illustrates a low-temperature sintering furnace for carrying out the method of sintering in accordance with the present invention.

DETAILED DESCRIPTION OF THE INVENTION

In accordance with the invention, sintering additives with grain-growth-promoting action are added to the nuclear fuel powder with arbitrary oxygen-to-metal ratio to adjust the micro structure, and the powder is pressed into blanks. The blanks are subsequently sintered in a continuous sintering furnace in an oxidizing atmosphere and are then treated in a reducing atmosphere. The oxidizing gas consists of technically pure carbon dioxide and is conducted through the furnace space in the same direction as the blanks, i.e. concurrent flow. The reducing gas, on the other hand, which may be mixed with a neutral protective gas i.e. a gas which is inert under the conditions of operation, such as nitrogen, is conducted through the furnace against the direction of motion of the blanks, i.e. counter-flow. The reducing gas may be provided with an appropriate degree of moisture for adjusting the residual fluorine content in the nuclear fuel. This method can, therefore, be called a two-stage process having an oxidative-sintering stage in a carbon-dioxide atmosphere and a reducing stage in a hydrogen-containing atmosphere. Both steps are carried out in a single sintering furnace. The furnace has two zones, i.e., the sintering zone and the reduction zone with the zones separated by a gas lock which also serves as a means for discharging the two gases, i.e. the oxidizing gas from the oxidative-sintering zone and the reducing gas from the reduction zone. The micro structure of the sintered bodies produced in this manner at low temperatures of 1000° to 1400° C. consists of finer grains and coarser grains, which are distributed homogeneously. This is achieved by adding sintering additives, to be discussed.

The starting powder to be pressed into blanks to be sintered for manufacture of nuclear fuel does not consistently have the same oxygen-to-metal ratio but generally varies, sometimes quite frequently and to a considerable extent, i.e. from a ratio of 2.0 to 2.2 and higher. Such variable starting powders have been termed nuclear fuel powder with "arbitrary" oxygen-to-metal ratio. The method of the present invention overcomes the difficulty of starting powders with arbitrary oxygen-to-metal ratios and reliably produces uniform end products even with starting powders with arbitrary oxygen-to-metal ratios.

The present method will now be described in detail with the aid of FIGS. 1 and 2, and compared with the state of the art.

FIG. 1 shows schematically the construction of a high-temperature sintering furnace such as is in use at the present time. This furnace, designated by numeral 1, contains a reduction zone R, in which a temperature of 500° to 600° C. prevails. Adjoining the latter is a sintering zone S with a temperature of 1700° C. On the output side of the furnace is a cooling zone A. The material to be sintered is moved, i.e. pushed or pulled into this furnace in the direction of the arrow 3. The reducing atmosphere 4 which contains hydrogen flows through the furnace against the travel direction of the material to be sintered.

FIG. 2, on the other hand, shows, likewise schematically, a low-temperature sintering furnace for carrying out the method according to the invention. This furnace is designated by numeral 2. The arrow 3 indicates the entering direction of the material to be sintered. The latter first gets into the sintering zone S with a temperature of 1100° C. and the $CO_2$-gas flows over it in the same direction. This gas is discharged through the adjacent lock 7, which in addition is flushed with a stream of nitrogen. Gas-locks are known in the art. The material to be sintered then travels through the lock into the reduction zone R, in which the same temperature of 1100° C. prevails, and subsequently, into the cooling zone A. A reducing gas, which consists, for instance, of 94% nitrogen and 6% hydrogen, flows against the travel direction of the material to be sintered through zones A and R and is likewise discharged through the lock 7. An over-stoichiometry required for the sintering process at temperatures from 100° C. on is adjusted through the use of carbon dioxide of technical purity. This stoichiometry occurs when the blanks pressed from oxide powders are heated up, remains constant during the sintering and is completely independent of the ratio of starting oxygen to metal of the metal powder used. In this process, the same sintering density is achieved as with the sintering process in the high-temperature furnace as per FIG. 1. This density is ≧94% of theoretical density and is reached after very short sintering times.

The following table shows the relationship between the sintering time and the sintering temperature according to this method:

| Sintering Time: | Sintering Temperature: |
| --- | --- |
| 30 min. | 1000° C. |
| 20 | 1100 |
| 10 | 1200 |
| 10 | 1300 |
| 5 | 1400 |

Longer sintering times or higher temperatures increase the sintering density only inappreciably and can therefore be used to adjust the microstructure variables. In the reduction zone R, hydrogen, hydrogen/inert gas or hydrogen/nitrogen mixtures are used dry or moistened. As shown in the figure, gas mixtures with only 6% by volume of hydrogen are sufficient to obtain an oxygen-to-metal ratio of 2.0±0.02 after 30 minutes at the temperatures give. Humidification of the reduction gas leads to lower fluorine contents in the sintered bodies. The fluorine contents are safely below 10 ppm.

Also with this method, microstructure variables are obtained such as have been optimized with the high-temperature method. The desired pores in the range of 1 to 10 $\mu$m are generated by the addition of $U_3O_8$. The mean grain size is 4 to 10 $\mu$m, depending on the sintering temperature and time. Controlled adjustment of this microstructure via the addition of $U_3O_8$ yields a matrix grain size of about 2 $\mu$m, in which a grain fraction of 20 to 50 $\mu$m is embedded. This bimodal grain structure exhibits better plasticity because the fine-grain regions form the skeleton of the sintered bodies and take up the mechanical load. In addition, the fission gas liberation during the operation of the reactor is lowered by the coarse and growth-stable bodies. This grain structure therefore is an optimum compromise with respect to the fuel properties, plasticity and fission gas retaining capacity.

The mentioned addition of up to 25% $U_3O_8$ allows the use of dry-processed revert material from the pellet production, which is converted into $U_3O_8$ by annealing. In this manner, it is possible to recycle nuclear fuel scrap into the production and to adjust at the same time the microstructure, as already mentioned. These $U_3O_8$ additions remain stable during the sintering and are converted to $UO_2$ only in the reduction stage. Thereby, this additive acts as a pore former and thus lowers the density. This lowering of the density is directly proportional to the amount of $U_3O_8$ additive (obtained from scrap).

From this discussion it is evident that in spite of substantially lower temperatures than with the previous high-temperature sintering method, products of equal quality are obtained. The lower temperatures, however, make possible substantially lower furnace heating power and in addition, the wear of the materials is substantially lower, which is reflected particularly advantageously in the operating costs. These are also affected advantageoulsy by the protective gases used in comparison with pure reduction gases.

The results obtained with this method will be demonstrated with the aid of the following embodiment examples.

The pressed bodies were prepared by directly pressing $UO_2$ powder or powder mixtures of $UO_2$ with gadolinium oxide or with $PuO_2$. The $UO_2$-powder had the following powder data:

Specific surface: 5 to 6 $m^2/g$
Bulk density: 2 $g/cm^2$
Average particle size: 6 $\mu m$ No lubricants, binders or pore formers of any kind were added to the powders or powder mixtures. In part of the samples, the only addition was recycled sintered material annealed to form $U_3O_8$. The density of the blanks was always 5.6 $g/cm^3$.

The powder composition, sintering conditions and pellet properties can be seen from the examples 1 to 7 of the following Table.

oxidizing gas to cause the $UO_2$ powder to come to a constant stoichiometric excess of $O_2$ to U and sintering said blanks therein at a temperature within the range of 1000°–1400° C., and subsequently exposing the sintered blanks in said furnace to a second atmosphere of hydrogen as a reducing gas at a temperature within the range of 1000°–1400° C.

2. Method according to claim 1, wherein the oxidizing gas is technically pure carbon dioxide.

3. Method according to claim 1, wherein moisture is added to the reducing gas to reduce residual fluorine content of the blanks.

4. Method according to claim 1 wherein the hydrogen gas is diluted with an inert gas.

5. Method according to claim 4, wherein the inert gas as is nitrogen.

6. Method according to claim 1 or claim 2, wherein the sintering time is about 30 minutes at a temperature of 1000° C. and 5 minutes at a temperature of 1400° C. and longer sintering times are provided for adjusting the micro structure of the nuclear fuel bodies until a prescribed micro structure is achieved.

TABLE

|  | Example 1 | Example 2 | Example 3 | Example 4 | Example 5 | Example 6 | Example 7 |
|---|---|---|---|---|---|---|---|
| Powder composition | 100% $UO_2$ | 100% $UO_2$ | 100% $UO_2$ | 100% $UO_2$ | 100% $UO_2$ | 100% $UO_2$ | 100% $UO_2$ |
| Powder O/U | 2.11 | 2.11 | 2.08 | 2.15 | 2.10 | 2.10 | 2.08 |
| $U_3O_8$ addition | — | 10% | — | — | — | — | 8% |
| Sintering-gas | $CO_2$ | $CO_2$ | $CO_2$ | $CO_2$ | $CO_2$ | $CO_2$ | $CO_2$ |
| Sintering-temperatures | 1100° C. | 1100° C. | 1100° C. | 1100° C. | 1000° C. | 1400° C. | 1100° C. |
| Sintering-time | 1 h | 1 h | 1 h | 1 h | 5 min | 1 h | 2 h |
| Reducing gas | $H_2$ | $H_2$ | $H_2$ | $H_2$ | $H_2$ | $H_2$ | 94% $N_2$/ 6% $H_2$ |
| Reduction-temperature | 1100° C. | 1100° C. | 1100° C. | 1100° C. | 1000° C. | 1400° C. | 1100° C. |
| Reduction-time | 15 min | 15 min | 15 min | 15 min | 15 min | 15 min | 2 h |
| Pellet properties: Sintering density ($g/cm^3$) | 10.51 | 10.32 | 10.51 | 10.52 | 10.27 | 10.64 | 10.44 |
| % of theoret. density | 95.9 | 94.2 | 95.9 | 96 | 93.7 | 97 | 95 |
| Fluorine | <5 ppm | <5 ppm | <5 ppm | <5 ppm |  |  | 3 ppm |
| O/U | 2.00 | 2.00 | 2.00 | 2.00 | 2.00 | 2.00 | 2.00 |

What is claimed is:

1. Method for manufacturing oxidic nuclear fuel bodies with oxygen-to-metal ratio of 2.0±0.02 at treating temperatures between 1000° and 1400° C., which comprises adding up to 25% $U_3O_8$ as a grain-growth-promoting sintering additive to a powder selected from the group consisting of $UO_2$ powder, a powder mixture of $UO_2$ with gadolinium oxide, and a powder mixture of $UO_2$ with $PuO_2$, mixing the additive and said powder and pressing the additive containing mixture into blanks, exposing said blanks in a furnace for a sintering time of up to 30 minutes to a first atmosphere of a mild 7. Method according to claim 1, wherein the $UO_2$-powder is a powder with the following properties:
Specific surface: 5 to 6 $m^2/g$
Bulk density: 2 $g/cm^3$
Average particle size: 6 $\mu m$.

8. Method according to claim 1, wherein said powder is $UO_2$ powder.

9. Method according to claim 1, wherein said powder is a powder mixture of $UO_2$ with gadolinium oxide.

10. Method according to claim 1, wherein said powder is a powder mixture of $UO_2$ with $PuO_2$.

* * * * *